Jan. 28, 1969    R. C. LUHDORFF    3,424,215
PITTING MECHANISM
Filed July 22, 1966    Sheet 1 of 2
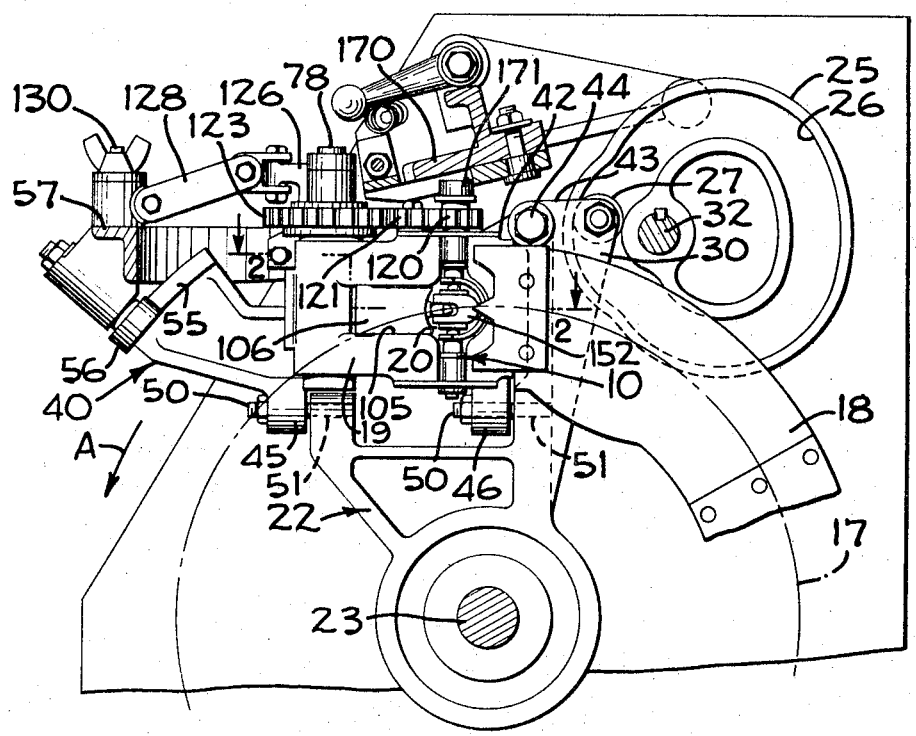
FIG_1
FIG_2
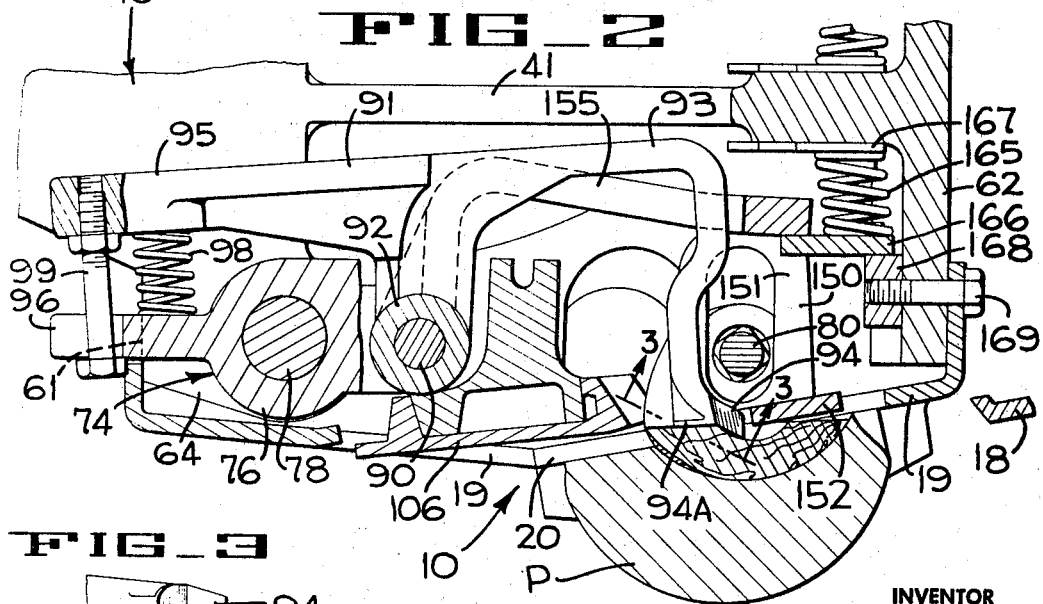
FIG_3
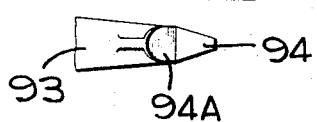
INVENTOR
ROBERT C. LUHDORFF
BY Francis W. Anderson
ATTORNEY

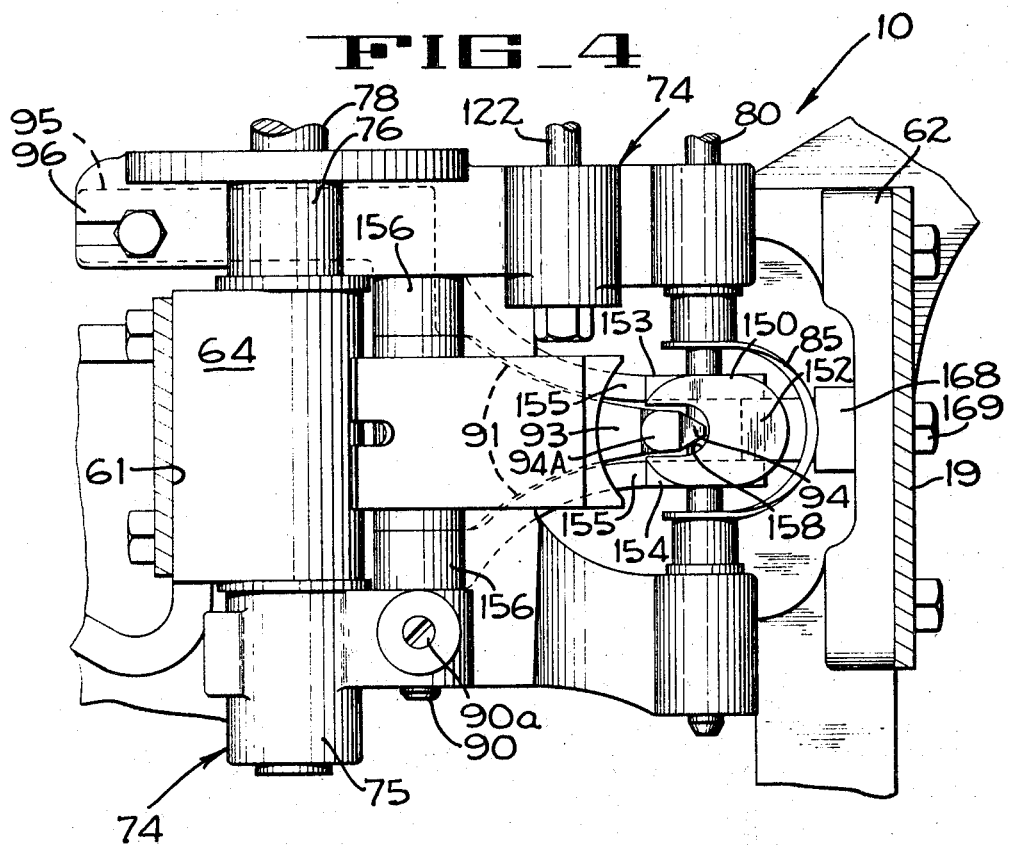

United States Patent Office 3,424,215
Patented Jan. 28, 1969

3,424,215
PITTING MECHANISM
Robert C. Luhdorff, Campbell, Calif., assignor to FMC Corporation, San Jose, Calif., a corporation of Delaware
Filed July 22, 1966, Ser. No. 567,175
U.S. Cl. 146—28                               2 Claims
Int. Cl. A34n 3/08; A47j 25/00; B23q 15/02

This invention relates to mechanism for pitting fruit and more particularly concerns an improved pitting head having means for preventing pit segments from becoming jammed in the head and interfering with its operation.

The pitting head of the present invention is an improvement of the pitting head disclosed in the United States Patent to Vadas No. 3,045,731. Specifically, the present invention involves an improvement in one element of the pitting head in said Vadas patent, the other elements of the present head being identical to the corresponding elements of the Vadas head and operate in exactly the same manner as said corresponding elements. Accordingly, the above-mentioned Vadas patent is incorporated by reference herein to disclose the structure and operation of all parts not specifically described herein.

During the operation of the pitting head disclosed in the Vadas patent, each of two oppositely facing halves of a peach is positioned adjacent an opening in the pitting head so that the pit half faces the opening. A knife is then moved out of the opening in the head and along an arcuate path circumscribing the pit half to sever the pit half from the remainder of the peach half. After the cut has been made and the knife has moved back into the head, the peach half with the severed pit half is moved away from the pitting head opening to a postion at which the pit half falls out of its socket, leaving a pitted peach half. Occasionally, during the cutting movement of the knife, a pit half has been dislodged from its socket and has been moved inwardly of the head causing a jamming condition of the mechanism therein. Accordingly, an object of the invention is to provide means for preventing jamming of the pitting mechanism of a pitting head of the type disclosed in the above mentioned patent to Vadas.

Another object is to provide an improved pitting head.

A further object is to provide an improved pit-locating and support member for a pitting head.

Other and further features and inventions will be apparent to one skilled in the art from the following description taken in connection with the accompanying drawings in which:

FIGURE 1 is a fragementary diagrammatic vertical section taken through a pitting machine in which the pitting head of the present invention is mounted.

FIGURE 2 is an enlarged fragentary horizontal section taken along line 2—2 of FIGURE 1 and particularly showing the head advanced from the position of FIG. 1 with the improved pit finder and support member of the present invention in operative position during cutting of a pit half from a peach half.

FIGURE 3 is a fragmentary elevation of the lower end of the pit finder and support member, the view being taken looking in the direction of arrows 3—3 of FIG. 2.

FIGURE 4 is an enlarged, fragmentary, side elevation of the head of FIG. 1 with the outer side plate removed, the rearward end of the plate being shown in section.

The improved pitting head 10 (FIGS. 1 and 2) of the present invention is particularly adapted for use with the pitting machine disclosed in U.S. Patent No. 2,376,526 to Albert R. Thompson, the construction and arrangement being such that the present pitting head 10 may be substituted for the head which was disclosed in said patented machine, without substantially altering the other parts of the machine.

During operation of this type of pitting machine each peach is oriented in a particular manner and delivered to a pair of oppositely disposed feed cups, each of which is hollow and is generally hemispherical in configuration. The cups grip opposite sides of the whole peach and move it along a portion of a circular path, indicated by phantom line 17 (FIG. 1) to carry the peach into contact with a circular saw which bisects the peach. The feed cups then move the two peach halves over a spreader unit which includes a pair of oppositely inclined guide plates 18 (one only being shown in FIGS. 1 and 2) that are effective to separate the peach halves and guide each half onto a fruit support plate 19 so that, as seen in FIG. 2, each peach half P comes to rest on one of the flat vertical plates 19 with the pit half facing an opening 20 in the plate.

In general, the head 10 is mounted on a cradle 22 which is secured to a shaft 23 that is pivotally mounted in the machine. During operation, the cradle and the head are pivoted forwardly in the direction of arrow A (FIG. 2) during the pitting of a peach half, and are then swung rearwardly to this initial rear position to receive the next peach half to be pitted. The head 10 is oscillated by means of a cam 25 having a cam track 26 adapted to receive a roller 27 rotatably mounted on an upper rear portion 30 of the cradle. The cam 25 is keyed to a shaft 32 which is rotated in timed relation with the other members of the machine, so that the head 10 is oscillated in timed relation with the feed cups (not shown), which are driven by the machine and, as previously mentioned, are arranged to move the peach halves P upwardly and forwardly along guide plates 18, and slide the halves onto opposite sides of the pitting head while the head is in its rearward position.

The head 10 includes a body portion 40 (FIG. 1) having a central longitudinal portition 41 (FIG. 2), and an upper rear ear 42 which is secured between a pair of spaced bosses 43 on the cradle 22 by a bolt 44. At its lower edge, the body portion 40 has two bosses 45 and 46 which carry positioning pins 50 adapted to fit in sockets 51 formed in the cradle. It will thus be seen that the pitting head is removably connected by a three point support to the cradle 22.

At its forward end, the body portion of the head is provided with an arcuate track 55 which has its center of curvature coincident with the center of shaft 23. The track 55 is engaged on its opposite sides by rollers 56 (one only being shown) supported by an overhead support bracket 57, which is mounted in fixed position between side plates of the machine.

The body portion 40 (FIG. 2) of the head carries a laterally directed cross member 62 at its rearward end. Spaced forwardly from the cross member 62, the body portion is provided with a pair of laterally disposed journals 64 (FIG. 4) having vertical bores. The mechanism mounted on one side of the central partition 41 is identical to the mechanism on the other side of the partition but oppositely disposed. One each side of the head, one of the fruit support plates 19 is secured to the body portion 40, extending between a front wall portion 61 of the body and the rear cross member 62. A knife support lever or carrier 74 has two vertically spaced bosses 75 and 76 journalled for rotation on a shaft 78 that is supported for rotation in the vertical journal 64 of the body portion. Each lever 74 extends rearwardly in the head (FIG. 2) between the central partition 41 and the corresponding fruit support plate 19 and, near its rearward end, the lever 74 rotatably journals a pitting knife shaft 80 which has a vertical axis. A U-shaped cutter in the form of an open loop knife 85 (FIG. 4) is secured by its legs to the shaft 80 so that oscillation of the shaft 80 about its axis causes oscillation of the knife. As previously mentioned, the fruit support plate 19 is provided with an opening of sufficient size to permit the knife to swing therethrough.

A pit finder shaft 90 (FIG. 4) is secured by a setscrew 90a in the knife support lever 74 in parallel relation to the shafts 78 and 80. The pit finder shaft 90 supports a pit finder lever 91 (FIG. 2) for oscillating movement, said lever including a hub 92 rotatable on shaft 90 and a rear arm 93 that projects rearwardly and laterally outwardly of the head in such a manner as to pass alongside and project beyond the pitting knife shaft 80 so that it may be moved outwardly through the opening 20 in the plate 19. In accordance with the present invention, the arm 93 has a pointed outer end portion 94 and a flat plate 94A. The pit finder lever 91 also includes a forward arm 95, which is offset upwardly (FIG. 4) to clear the journal 64 and extends forwardly between the partition 41 (FIG. 2) and the journal end of the knife support lever 74. The end portion of the arm 95 is disposed in spaced relation to a lug 96 formed on the lever 74. A spring 98, disposed between the arm 95 and the lug 96, is arranged to urge them apart. An adjustment bolt 99 is anchored in the arm 95 and passes freely through an opening in lug 96, and is arranged to limit the movement of the arm 95 and the lug 96 away from each other. By means of this arrangement the spacing between the path of movement of the pitting knife 85 and the point of the pit finder end 94 may be adjusted so that there will be a predetermined distance between the pit finder point and the knife as it moves along its arcuate path during the pitting operation.

The forward edge of the opening 20 in the support plate 19 is cut away to form a recess 105 (FIG. 1) adapted to receive a ramp plate 106 which is rigidly connected to or formed integrally on the knife support lever 74 in such a manner that, when the lever 74 is in its retracted position relatively close to the partition 41, the ramp 106 is offset inwardly from the surface of the fruit support plate 19. When the lever 74 is moved outwardly away from the partition 41, as in FIG. 2, the ramp 106 moves to a position approximately flush with the normal surface of the fruit support plate 19.

Each pitting knife shaft 80 projects upwardly from the head and is provided with a gear 120 (FIG. 1) which is keyed to shaft 80 and meshes with an idler gear 121 that is rotatably journalled on a shaft 122 (FIG. 4) that is secured in the lever 74. Each idler gear 121 meshes with a drive gear 123 rotatably supported on shaft 78, and the two drive gears 123 mesh with each other so that the two pitting knives on opposite sides of the head are arranged to be operated simultaneously. One of the drive gears 123 is provided with a drive lever 126, which is connected by a suitable linkage 128 to a pivot post 130 mounted on the overhead support bracket 57. The several gears are so arranged that when the pitting head is moved forwardly in unison with the peach feeding mechanism and a peach half overlies each fruit support plate 19, the shafts 80 are rotated and the pitting knives 85 are caused to swing outwardly through the openings 20 to make arcuate cuts around the pit halves in the peach halves.

An auxiliary support plate 150 (FIG. 2) is provided to resiliently support the peach half from the pit side of the peach half. This auxiliary fruit support plate comprises a cage-like member 151 consisting of a forward plate 152 integrally formed on two inwardly projecting spaced arms 153 and 154. Each of the arms 153 and 154 is welded to a bent lever 155 that has a hub 156 (FIG. 4) rotatably supported on shaft 90. The forward plate 152 has a recess 158 (FIG. 4) adapted to permit passage therethrough of the pit finder end, and the arms 153 and 154 are slotted (FIG. 2) to receive the knife shaft 80.

The auxiliary support plate 150 is urged outwardly of the head by a spring 165 which is disposed between a tab 166 formed on the lever 155 and an abutment plate 167 secured to partition 41. The outermost position of the auxiliary support plate 150 is determined by the engagement of the tab 166 on the lever 155 with an adjustable stop 168 which may be adjustably secured to the body member 62 by a capscrew 169.

At the time that a peach half is guided onto the support plate 19, the knife support lever 74 is in a retracted position wherein the outer end of the pit finder lever 91, and the knife 85 are withdrawn inside the head. At a predetermined time during the joint forward movement of the peach half and the head, the lever 74 is swung clockwise (FIG. 2) to move the outer end of the pit finder 91 into contact with the pit half. As soon as the pit finder has engaged the pit, the gears operatively connected to the knife shaft 80 rotate the shaft to swing the knife around the pit half to separate it from the peach half. The lever 74 is then swung counterclockwise to retract the pit finder into the head. The clockwise and counterclockwise pivoting of the lever 74 is accomplished by means of a pair of overhead cams 170 (FIG. 1) that receives a cam roller follower 171 which is mounted on the upper end of the knife shaft 80. The configurations of the camming slots in the cams 170 are disclosed in the above-mentioned Vadas Patent 3,045,731 and are not further disclosed herein. In general, each cam slot has an outwardly directed portion that guides the associated follower roller 171 outwardly to move the pit finder into contact with the pit half; a straight portion that maintains the lever 74 and its associated members in the projected position for a predetermined interval while the knife travels around the pit half; and an inwardly directed portion that swings the lever 74 inwardly of the pitting head after the cut has been made.

If desired, a cam controlled linkage disclosed in said Vadas patent may be used to exert a resilient load on the knife to shift it inwardly to maintain contact with the surface of the pit half as it makes its cutting stroke around the pit half.

It will be particularly noted in FIG. 4 that, when the knife cuts around the pit half, the flat plate 94A adjacent the outer end of the pit finder partially closes the opening in the head into which the knife is swung. More importantly the plate 94A is positioned so that it abuts a flat surface of the pit half and prevents the pit half from sliding out of its cavity and into the pitting head as a result of the close cutting action of the knife. Accordingly, the pit half is prevented from entering the pitting head and, as soon as the head is swung rearwardly, the pit half can fall free of the peach half as it is advanced by the transfer cup.

It will be understood that, as the head is swung rearwardly, the gears are rotated in an opposite direction to swing the knife back to its initial position, and the overhead cam track moves the lever 74 inwardly in preparation for receiving a new peach half to be pitted.

From the foregoing description it will be evident that the present invention provides a unique, effective mechanuism for preventing pit halves from becoming jammed in pitting heads.

I claim:

1. In a pitting head of the type wherein a cutter is moved in an arcuate path outwardly through an annular opening in peach support plate means to cut around a pit half that is supported adjacent the opening against the outer surface of the plate means, a central recess in said plate means, and a pit finder movable at least partially through said central recess in the plate means, to engage the surface of the pit; the improvement wherein a flat plate member is carried by said pit finder and is mounted in a position to partially block said recess to prevent the pit half from moving into the pitting head after it has been severed by the cutter.

2. The pitting head of claim 1, wherein said flat plate member is substantially coplanar with said plate means during cutting, said pit finder having a pointed outer end portion which projects past said pit finder plate member for entering the pit cavity.

References Cited

UNITED STATES PATENTS

| | | | |
|---|---|---|---|
| 2,443,863 | 6/1948 | Lindley | 146—28 |
| 2,581,785 | 1/1952 | De Back et al. | 146—28 |
| 2,859,783 | 11/1958 | Skog | 146—28 |
| 2,946,361 | 7/1960 | Shog et al. | 146—28 |
| 3,045,731 | 7/1962 | Vadas et al. | 146—28 |

W. GRAYDON ABERCROMBIE, *Primary Examiner.*